R. HAMILTON.
COTTON CHOPPER.
APPLICATION FILED AUG. 11, 1914.

1,135,790.

Patented Apr. 13, 1915.
4 SHEETS—SHEET 1.

WITNESSES
F. E. Barry
C. E. Trainor

INVENTOR
Robert Hamilton
BY Munn & Co.
ATTORNEYS

R. HAMILTON.
COTTON CHOPPER.
APPLICATION FILED AUG. 11, 1914.

1,135,790.

Patented Apr. 13, 1915.
4 SHEETS—SHEET 2.

WITNESSES
F. C. Barry
C. E. Trainer

INVENTOR
Robert Hamilton
BY Munn&Co.
ATTORNEYS

THE NORRIS PETERS CO., PHOTO-LITHO., WASHINGTON, D. C.

R. HAMILTON.
COTTON CHOPPER.
APPLICATION FILED AUG. 11, 1914.
1,135,790.
Patented Apr. 13, 1915.
4 SHEETS—SHEET 3.
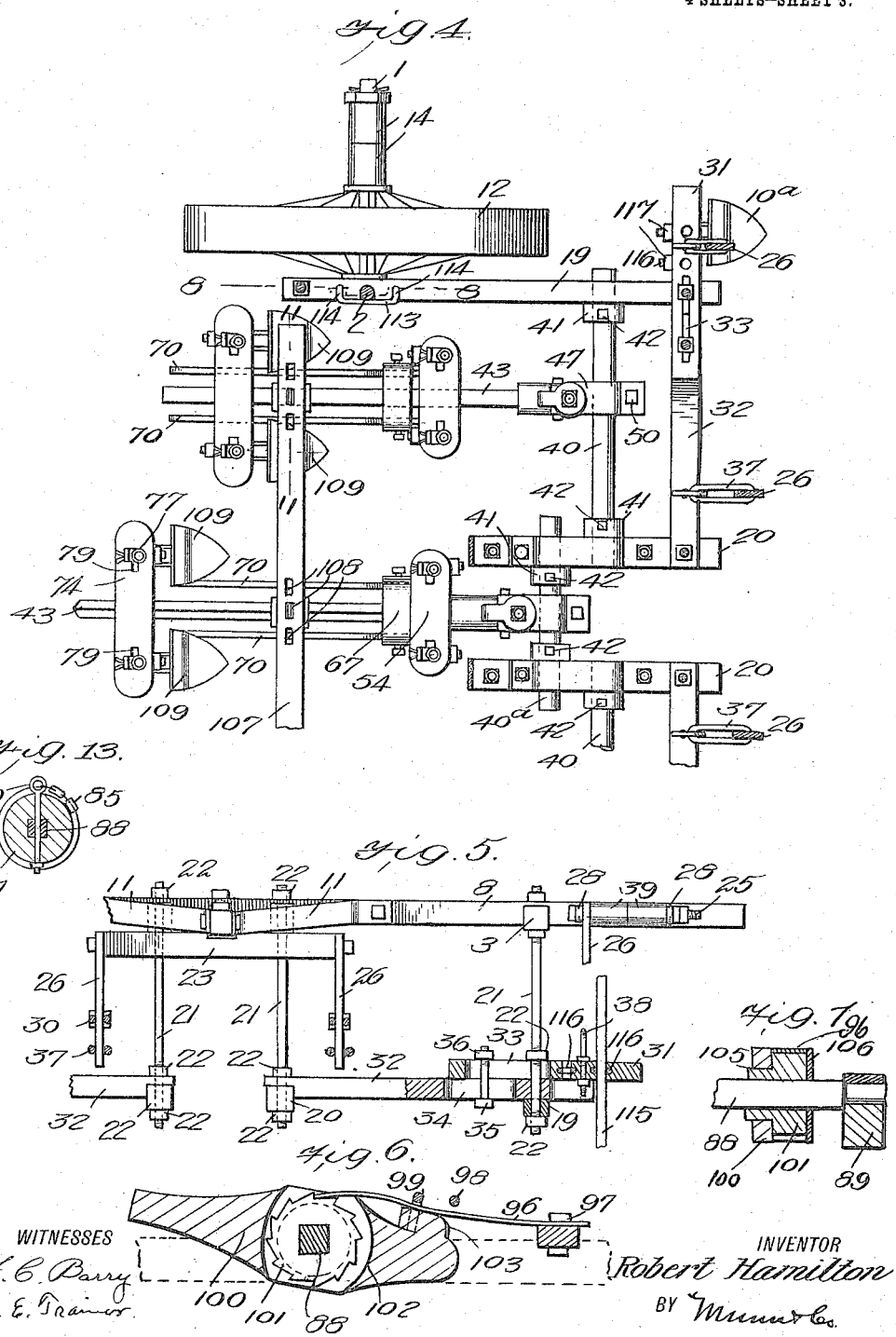

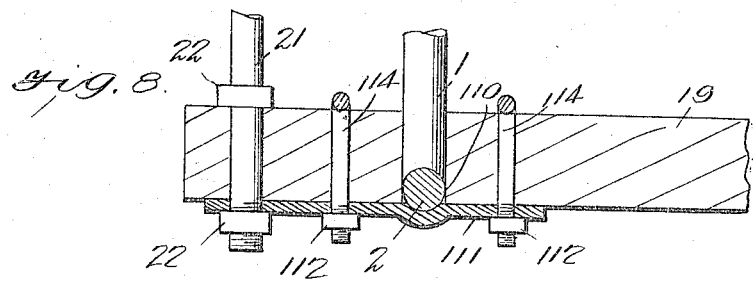
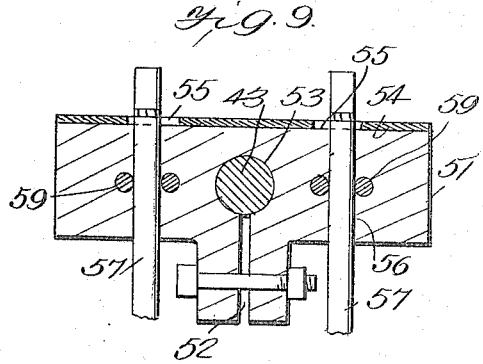
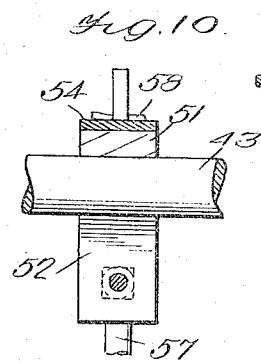
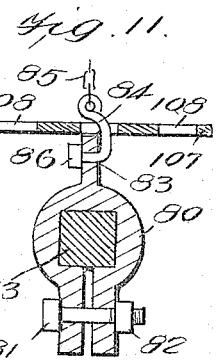
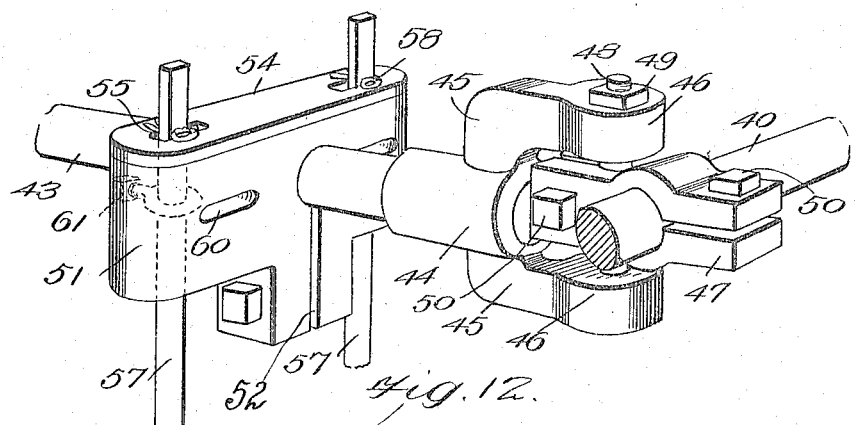

UNITED STATES PATENT OFFICE.

ROBERT HAMILTON, OF COMMERCE, TEXAS.

COTTON-CHOPPER.

1,135,790.   Specification of Letters Patent.   Patented Apr. 13, 1915.

Application filed August 11, 1914. Serial No. 856,245.

*To all whom it may concern:*

Be it known that I, ROBERT HAMILTON, a citizen of the United States, and a resident of Commerce, in the county of Hunt and State of Texas, have invented a new and useful Improvement in Cotton-Choppers, of which the following is a specification.

My invention is an improvement in cotton choppers, and has for its object to provide a device of the character specified, comprising a wheel supported frame having a series of adjustable chopping devices for cutting out all of the plants in the row except those which it is desired to retain, and in which each of the chopping devices is mounted on an adjustable support which carries fenders and cultivating mechanism for cultivating the plants after thinning.

Figure 1:
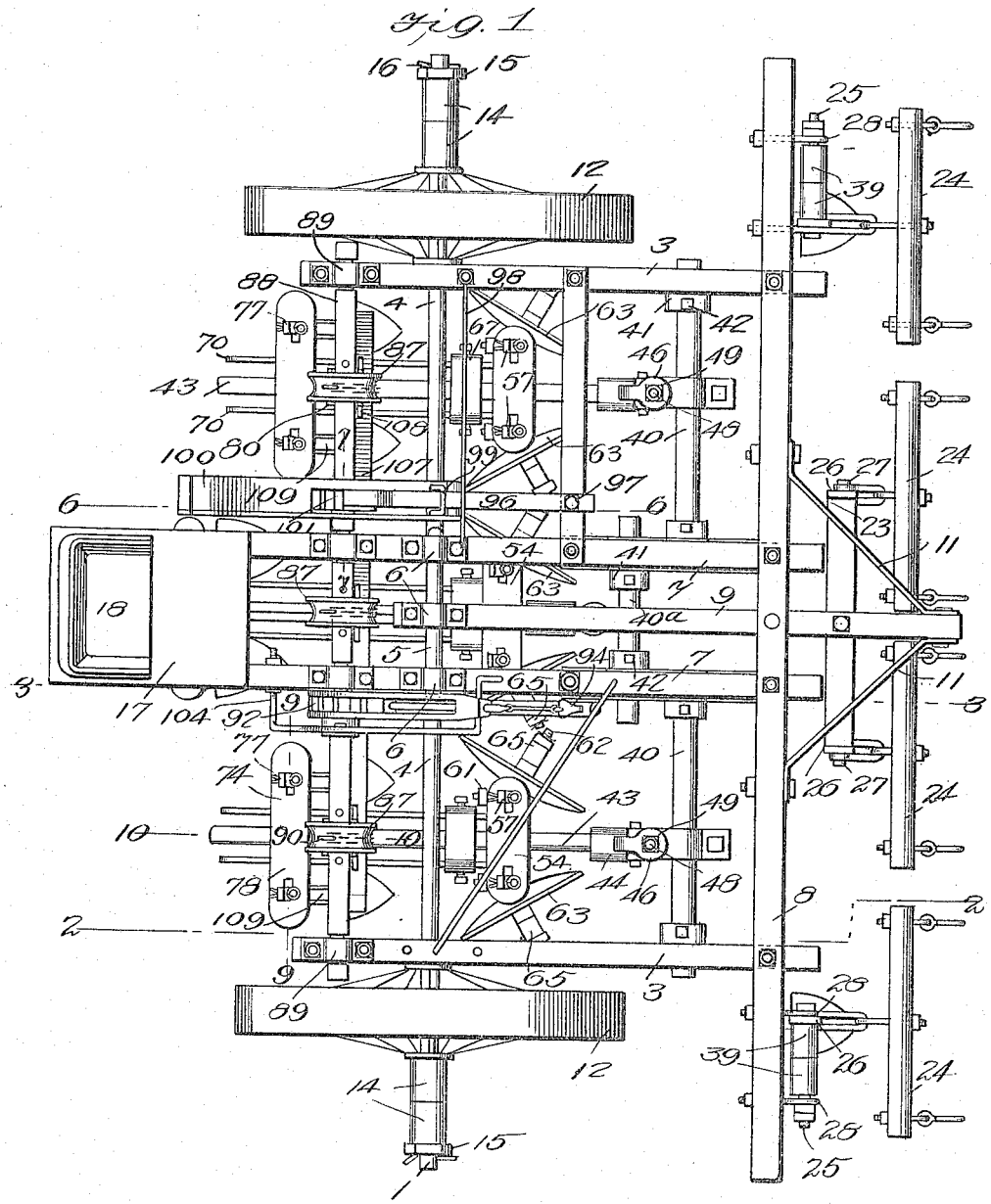
Figure 2:
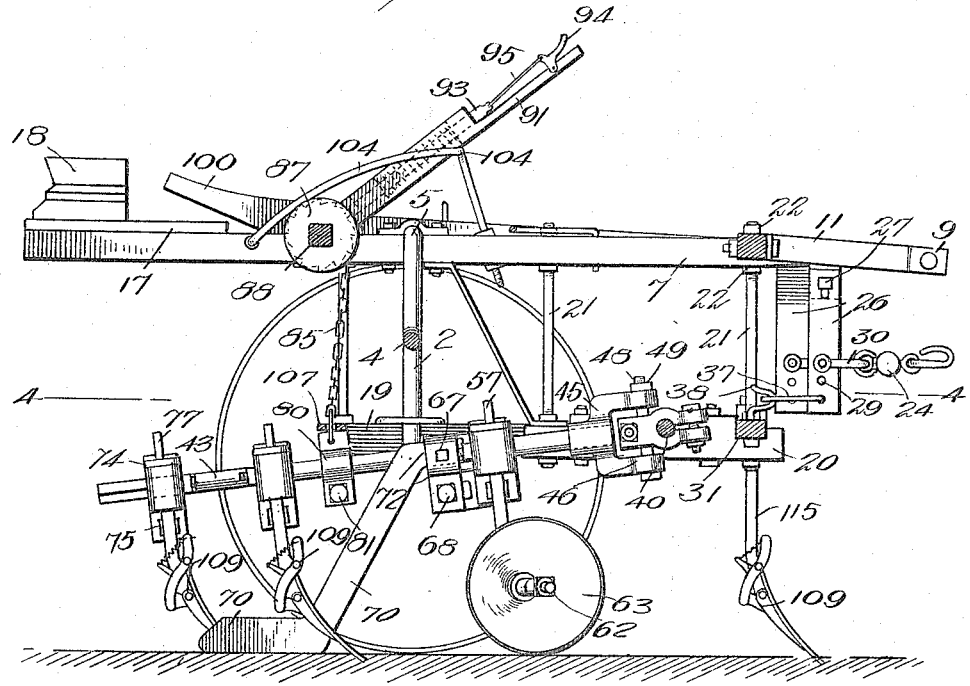
Figure 3:
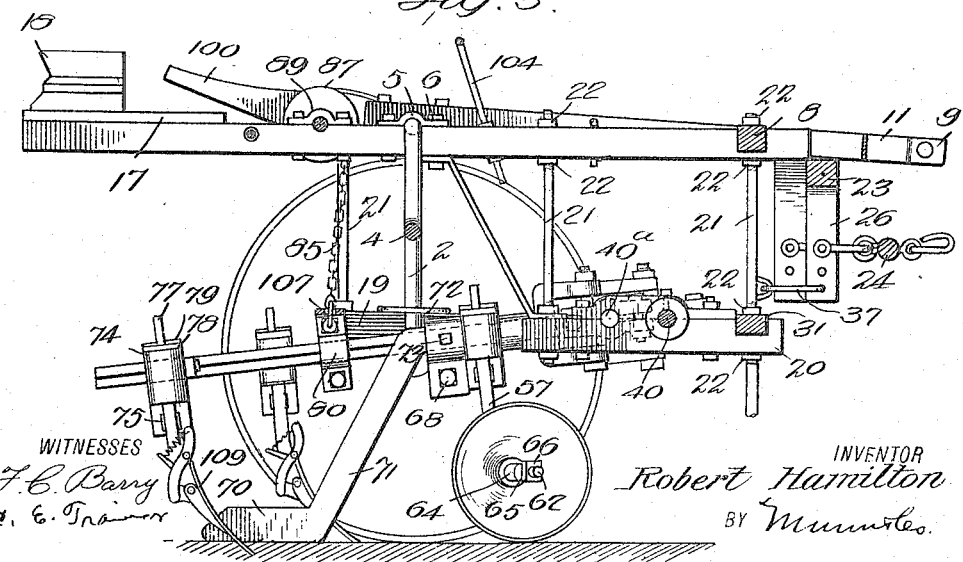

In the drawings:—Figure 1 is a top plan view of the improved chopper, Figs. 2, 3, 6, 7, 9 and 10 are sections on the lines 2—2, 3—3, 6—6, 7—7, 9—9 and 10—10, respectively, of Fig. 1, Fig. 4 is a section on the line 4—4 of Fig. 2, Fig. 5 is a partial front view with parts in section, Figs. 8 and 11 are sections on the lines 8—8 and 11—11, respectively, of Fig. 4, Fig. 12 is a perspective view of the mounting of one of the beams, and Fig. 13 is a transverse vertical section through the adjusting shaft for the plow beams at one of the pulleys.

The present embodiment of the invention comprises a supporting frame, supported by an axle composed of spindles 1, and vertical portions 2 at the inner sides of the spindles, the said vertical portions extending upwardly through openings in longitudinally extending bars of the frame to be later described. The axle is then provided with inwardly extending portions 4 in alinement with the spindles, and the central portion of the axle is arched upwardly as indicated at 5, and is journaled in sectional bearings 6 on a pair of parallel bars 7, extending longitudinally of the frame.

A bar 3 is arranged at each side of the frame parallel with the bars 7, and the bars 3 and the bars 7 are connected at their front ends by a bar 8, extending transversely of the frame, and a tongue 9 is also connected to the bar 8 between the members of the pair of bars 7, and to the portion 5 of the axle, the rear end of the tongue being connected to the axle by a sectional bearing 6. The tongue extends in front of the bar 8 and is braced against the said bar by inclined braces 11, and the ends of the bar 8 extend well outside of the bars 3 at each side of the frame.

Wheels 12 are journaled on the spindles, and it will be noted from an inspection of Figs. 1 and 4 that the spindles are of much greater length than the hubs of the wheels, and sleeves 14 are arranged on each spindle to hold the wheel in proper position with respect to the spindle. A washer 15 is arranged at the outer end of each spindle, and a key 16 is passed through the spindle outside of the washer. It will be evident that by rearranging the sleeves 14 the wheels may be widened in accordance with the width of the row to be cultivated. For instance, one of the sleeves 14 may be arranged inside the wheel instead of outside, or both may be arranged in this manner if desired.

The bars 7 extend in rear of the axle, and a plate 17 is arranged on the said bars connecting their rear ends. A seat 18 is seated on the plate for the driver, and the controlling mechanism to be later described is arranged directly in front of the seat and directly in front of the bars 7. The frame is completed by longitudinally extending bars 19 and 20, which are arranged below the bars 3 and 7, and are suspended from the said bars, by means of hanger rods 21. The hanger rods 21 have their ends threaded, and are passed through the bars 3, 7 and 8 at one end and through the bars 19 and 20 at the other, and are engaged by nuts 22, above and below the said bars. The frame thus consists of upper and lower portions connected by the hanger rods 21.

A double-tree 23 depends from the tongue in front of the bar 8, and swingle-trees 24 are connected indirectly with the doubletree. Other swingle-trees 24 are indirectly connected with bolts 25 at each side of the front of the machine. Plates 26 depend from the ends of the doubletree and from the bolts 25, each plate having a slot in its upper end, and the plates at the doubletree are connected to the doubletree by means of bolts 27. The plates at the bolts 25 are mounted directly on the bolts, and it will be noticed from an inspection of Fig. 1 that the bolts are of considerable length and are mounted in eye bolts 28, connected with the bar 8 before mentioned.

Each of the plates 26 is provided at its lower ends with a series of openings 29, and the swingle-trees are connected to the plates by means of clips 30, engaging the central ring of the swingle-tree and held to the plate by means of a pin or bolt in the usual manner. Each of the plates connected with the double-tree is further braced against an extension 31, connected to a bar 32, which connects the front ends of the adjacent bars 19 and 20.

Each of the bars 32 is arranged directly below the bar 8, and they are spaced apart at their inner ends as shown more particularly in Fig. 5. Each of the extensions 31 is mounted for longitudinal adjustment with respect to the adjacent bar 32. The extensions are longitudinally slotted as indicated at 33, and the bars 32 are slotted as indicated at 34 in register with the slots 33, and a bolt 35 is passed through the registering slots and is engaged by a nut 36 to fix the extension with respect to the bar. The hanger rods 21 also assist in holding the extension to the bar 32, the said rods passing through the extensions.

Each of the plates 26 is braced against the frame by means of a loop 37 which engages the lowermost opening 29 of the plate at one end, and a hook 38 on the adjacent bar 28 or on the adjacent extension 31 of the said bar. The outer-most plates 26 may be adjusted in accordance with the adjustment of the wheels, the lower end being adjustable outward by means of the extension 31, while the upper end is adjustable in the following manner: It will be noticed that the bolts 25 are of considerable length, and that the eye bolts 28 are spaced apart from each other a considerable distance. The plates 26 have slots as before mentioned, through which the bolt 25 extends, and sleeves 39 are arranged on the bolt to hold the plate 26 in adjusted position. It will be evident that by changing the relative positions of the sleeves 39 the plate 26 may be adjusted with respect to the bolt.

A shaft 40 is mounted at each side of the frame, on the bars 19 and 20, the said shafts 40 being in alinement, and another shaft 40$^a$ is mounted between the bars 20, being supported by both bars. The shafts 40 and 40$^a$ are supported in the bars, and collars 41 are held on the shafts near each end to prevent longitudinal movement thereof, the collars being held in fixed position by set screws 42.

The chopping and cultivating mechanism is supported from the shafts 40 and 40$^a$. Referring to Fig. 12, it will be noticed that a plow beam 43 is connected with each shaft 40 and 40$^a$. Each of the beams is received at its front end in a sleeve 44, having outwardly and forwardly extending arms 45, and each arm is provided at its free end with a bearing 46. A sectional coupling 47 is connected to the arms of each sleeve by means of a bolt 48. The bolt is passed upwardly through the rear end of the coupling and through the bearings 46 of the arms 45, and is engaged by a nut 49, above the uppermost bearing. The coupling is split at each end, the bolt 48 passing through an opening at the inner end of one split, while a bearing for the shaft 40 or 40$^a$ is provided at the inner end of the other split.

A bolt 50 is passed through each end of the coupling transversely of the plane of the split, and it will be evident that by means of the bolts, the coupling sections may be clamped on the shaft 40 or on the bolt 48. By loosening the front bolt 50 the coupling 47 may be adjusted longitudinally of the adjacent shaft 40 or 40$^a$, as the case may be, and it will be evident that the beam may be swung angularly with respect to the shaft 40 or 40$^a$, swinging on the bolt 48.

The arrangement of the three plow beams is the same, and each supports a series of three elements, namely, a chopping element, a cultivating element, and a fender element. In addition a suspending device is mounted adjustably on each beam. A T shaped bracket 51 is mounted to slide on each beam near the front end thereof, and the stem portions of each of the brackets is split as indicated at 52, and the bracket is provided with a transverse opening 53 at the inner end of the split for receiving the beam 43. A reach plate 54 is arranged on the upper face of each of the brackets, the said reach plate having longitudinally extending slots 55 at each end. The bracket is provided at each end with a vertical opening 56, registering with the adjacent slot of the reach plate, and a shank 57 is passed through each of the openings 56. Each shank passes through the adjacent slot 55 of the reach plate, and it will be seen that the upper ends of the shanks are flattened as shown, and a cotter pin 58 is passed through an opening in the flattened portion above the reach plate. The flattened portion of the shank engages the slot 55 of the reach plate, and it will be evident that the engagement prevents angular movement of the shank with respect to the bracket. An eye bolt 59 is arranged in an opening 60, at each end of the bracket, one of the shanks 57 engaging the eye of each bolt. The stems of the bolts pass out rearwardly from the bracket, and are engaged by nuts 61, which are threaded on to the stems. It will be evident that by tightening the nuts the shanks may be clamped with respect to the brackets. Each of the shanks 57 is provided at its lower end with a lateral journal pin 62, and a concavo-convex disk 63 is arranged on each journal pin. Each of the disks 63 is provided with a hub 64, on its convex face for engaging the journal pin of the adjacent shank, and a sleeve 65 is arranged on each journal pin between the nut 66 which is threaded on to the outer end of the journal pin and the hub of the disk.

It will be noticed from an inspection of Fig. 1 that the disks 63 of each bracket are inclined with respect to each other, the planes of the disks diverging rearwardly. The shanks may be adjusted toward and from each other by loosening the nuts 61, and moving the shanks in the brackets. When the nuts are tightened the shanks will be clamped to the bracket. They may also be adjusted toward and from each other by different arrangements of the sleeves 65, as for instance, by placing the sleeve 65 on the inner side of the disk instead of on the outer side.

A fender support 67 is arranged in rear of each of the brackets 51, each of the said supports being merely a split sleeve mounted to slide on the beam and held in adjusted position by means of a bolt 68, and a nut 69. The bolt is passed through the support at the split, and it will be evident that by tightening the nut the support may be clamped on the beam.

Each fender 70 is provided with a forwardly and upwardly extending arm 71, having a lug 72 at its upper end which enters a recess in the rear of the support 67. A set screw 73 is provided for holding each fender in place, the set screw passing through the support into the recess and engaging the lug 72 of the fender. The fenders are parallel and spaced apart from each other, and in rear of each fender support a bracket 74 is provided for supporting a pair of cultivating plows.

Each of the brackets 74 is similar to the bracket 51, except that the bracket 74 is of greater length. Each bracket is T shaped, and has a transverse opening for the beam, and a split leading from the opening through the stem of the T. A bolt 75 is passed through an opening transversely of the split, and a nut 76 is threaded on to the bolt for clamping the bracket on the beam. The standards 77 of plows are passed through vertical openings in the ends of the bracket, and a reach plate 78 is arranged on the upper face of each of the brackets. Each of the reach plates is provided with longitudinal slots 79 at its ends, and the upper ends of the standards are flattened in the same manner as the upper ends of the shanks 57, and are passed through the slots to prevent angular movement of the standards with respect to the brackets. Above the reach plates keys are passed transversely of the standards, and the standards are held in the openings of the brackets in the same manner as the shanks 57 of the disk supports are held in the brackets 51, that is, by means of an eye bolt whose eye engages the standard and which may be clamped on the standard by means of a nut.

A suspending bracket 80 is arranged on each beam between the bracket 74 and the fender support, each of the said brackets being in fact a split sleeve embracing the beam. A bolt 81 is passed transversely of the split, and is engaged by a nut 82. The bracket has also an upstanding lug 83, and a hook 84 connected with the lower end of a chain 85, engages the opening of each lug. Each of the hooks is held in place by a nut 86, which is threaded on to the bill on the opposite side from the body of the hook. It will be evident that by loosening the nuts 82 the suspension brackets may be adjusted longitudinally of the beam. The chains 85, pass upwardly from the several suspension brackets 80, and wind upon reels 87 on a shaft 88, journaled transversely of the frame in sectional bearings 89 on the bars 3 and 7. It will be noted that the shaft 88 is square in cross section, and that the ends are rounded to fit the sectional bearings 89. The reels 87 have square openings for receiving the shaft, and they are held in adjusted position on the shaft by means of pins 90, which pass through radial openings in the reels and engage openings in the shafts. The upper end of each of the chains 85 is connected with the pin 90 of the adjacent reel, and it will be obvious that when the shaft is rotated in the proper direction, the chains will wind upon the reels to simultaneously raise or lower the rear ends of the beams.

The shaft is rotated by means of a lever 91, having one end forked and having the arms of the fork journaled on the shaft 88 on the opposite sides of a ratchet wheel 92. The shaft is provided with a longitudinally movable pawl or latch 93, for engaging the teeth of the reel, and the pawl or latch is moved by means of a latch lever 94 pivoted to the lever 91, and connected to the latch by a link 95. The latch is spring pressed toward the ratchet wheel, and it may be released from the wheel by pressing the latch lever toward the lever proper. It will be noted that the latch lever 94 is adjacent to the occupant of the seat 18, and that the lever 91 is swung toward the occupant of the seat to operate the shaft in a direction to raise the beams.

A holding pawl 96 is provided, the said pawl being in the form of a resilient strip which is secured to the frame of the machine at its front end as indicated at 97. The rear end of the strip passes beneath a rod 98, extending transversely of the frame between the bars 3 and 7, and thence beneath a loop 99 on a treadle or foot plate 100, journaled on the shaft 88. The rear end of the strip engages the teeth of a ratchet wheel 101, on the shaft 88. The ratchet wheel is within a vertical recess 102 in the foot plate, and the foot plate is provided with a cam portion 103 at its front end which is adapted to engage the pawl 96 just in front of the loop 99. The rear end of the foot plate extends in position for engagement by the left foot of the driver seated in the seat 18, and it will be obvious that when pressure is made on the rear end of the foot plate, the front end will be lifted, and the cam 103 will lift the pawl 96 to disengage it from the ratchet wheel 101. A further downward movement of the rear end of the foot plate will act as a brake to slow the rotation of the shaft 88. It will be obvious that when the rear end of the foot plate is pressed firmly downward, as soon as the short end engages the rod 98, pressure will begin to be exerted on the shaft 88. The shaft extends through the bearings in the foot plate, and it is obvious that any pressure on the rear end of the foot lever must increase the friction between the shaft 88 and the bearings of the foot plate. It will be noted that the ratchet wheel 101 has a hub portion 105 extending into an opening in the foot plate 100 at the opening for the shaft 88. The recess 102 is formed in one side of the foot plate 100, and a cover plate 106 is connected to the side of the foot plate to cover the said recess. Thus the ratchet wheel is held in the recess, and when pressure is made on the rear end of the foot plate there will be a braking action on the extension 105 of the ratchet wheel to prevent too rapid downward movement of the rear ends of the beams.

A guard 104 is connected with the frame at the shaft 88, and the said guard extends beneath the lever 91 before mentioned (when the lever is in its most forward position) to act as a stop to limit the forward movement of the lever, and as a support for the lever when it is in the position shown in Fig. 2 to hold the lever in position to be grasped by the driver in the seat.

A reach plate 107 is arranged transversely of the frame below the shaft 88, and above the beams 43. It will be noted that the said plate is provided with a series 108 of openings at each beam, and that the hook 84 of each beam passes through one of the openings 108. The reach plate thus properly spaces the rear ends of the beams with respect to each other.

The lower end of each of the standards 77 is provided with a trip plow 109 of the usual construction.

It will be noted from an inspection of Fig. 1 that one of the beams 43 is circular in cross section and the other two are square in cross section. One of the square beams is arranged with its faces horizontal and perpendicular, while the other is arranged with its diagonals horizontal and perpendicular. The openings for the beams in the brackets will be of a cross section corresponding to that of the beam. It will be understood that in practice but one form of beam will be used, and this beam may have a cross section corresponding to that of any of the several shown.

It will be noted from an inspection of Fig. 8 that the portions 2 of the axles pass upwardly through recesses 110 in the inner faces of the bars 19, and that approximately U-shaped clips are used for holding the said portions in the recess. A plate 111 is arranged beneath each bar 19, the plate being held to the bar by the lowermost nut 22 on the rod 21, and by means of nuts 112 on the arms of the U shaped clips before mentioned. Each of the clips comprises a body 113, which is arranged on the inner side of the portion 2 of the axle, and arms 114 which first extend inwardly and then downwardly through the bar 19 and through the plate 111 before mentioned, where they are engaged by nuts 112 below the plate.

It will be noticed from an inspection of Figs. 1, 4 and 5 that a plow 109 is arranged directly in front of each wheel. Each of the plows is connected to a standard 115, similar to the standards 77 of the plows supported by the beams. This standard 115 is mounted to slide in the outer end of the adjacent extension 31, and is adjusted with the extension. The standard is held in position by means of an eye bolt 116, which is arranged in the extension in the same manner as the eye bolts of the brackets 74, and is engaged by a nut 117 in rear of the extension 31 to clamp the standards in adjusted position.

The extension 31 is provided with two openings for receiving the standard, and an eye bolt 116 is arranged at each opening. The adjustment for the plows 109 in front of the wheels may be made by means of the openings, that is, by engaging the standard with the inner or the outer opening. The adjustment may be further made by means of the slots 33 and 34, and the bolt and nut 35—36. This adjustment of the plow is made to correspond with the adjustment of the wheels. The beam 43 of the shaft 40 may be also adjusted longitudinally of the said shafts by loosening the bolt 50 at the front of the sectional coupling 47. No adjustment is required for the central beam 43 since it is always at the center of the machine, and for this reason the shaft 40ᵃ is of less length than the shafts 40.

The cutting disks 63 of each bracket 51 may be adjusted toward and from each other in the openings 60, and the standards of the two plows of each bracket 74 may be similarly adjusted. No adjustment is necessary for the fenders, since the fenders are always in position on opposite sides of the rows to prevent the plants being covered by dirt from the plows 109.

It will be noted from an inspection of Fig. 1 that the plows are arranged just outside of the fender, and that the fenders extend at the three beams slightly in rear of the plows. The several supporting brackets for the disks, the plows and the fenders may be adjusted longitudinally of the beams to the required arrangement in any particular case. When the beams 43 on the shafts 40 are adjusted either outwardly or inwardly the reels 87 must be adjusted on the shaft 88 to correspond with the adjustment of the beam. The shaft 88 is preferably provided with radial openings corresponding in spacing to the spacing of the opening in the reach plate 107. The chains pass upwardly through the openings 108 in this plate, and the reach plate holds the beams in adjusted position. All of the beams may be simultaneously lifted or lowered by means of the lever 91. When the wheels and the plows in front of the wheels are moved outwardly or inwardly, the end plates 26 are also adjusted with the plows and the wheels, so that the outermost swingletrees are directly in front of wheels.

The disks cut out the plants not needed, leaving a plant between each pair of plows, and between each pair of fenders. The plows cultivate the ground on each side of the plants. The disks constitute the choppers for the cotton. When the machine is driven across the cotton rows, a block of ground will be left in which there are a few stalks of cotton, and this is the stand of cotton that is to be left. Should the chopper be provided merely with the disks and no plows nor fenders, there would be left in this block of ground a few stalks of cotton and between the blocks of ground there would be a ridge caused by the disks turning the earth from each side of the block of untouched ground into the center. The plows however, following after with their fenders on the same beam, plow out the middles, and the fenders prevent the cotton from being covered. The disks may be adjusted by changing the sleeves 14, either one or both in order to leave a broader or narrower untouched space of ground.

I claim:—

1. A cotton chopper, comprising a main wheel supported frame, a pair of shafts journaled in alinement at opposite sides of the frame and at the front thereof, a shaft journaled between and in rear of the first-named shafts, a plow beam pivoted at its front end on each of the said shafts, a series of supporting brackets on each plow beam and movable longitudinally thereof, means in connection with each bracket for holding the bracket in adjusted position, a pair of uprights or standards adjustable vertically with respect to the front bracket of each beam, a concavo-convex cutting disk journaled at the lower end of each standard or upright, the disks of each bracket being arranged with their convex surfaces adjacent and being spaced apart and being inclined away from each other toward the rear, a pair of fenders connected with each of the intermediate brackets of the beams and extending rearwardly in parallel relation, a pair of cultivating plows connected with the rear bracket of each beam and adjustable vertically with respect thereto and arranged to cultivate on each side of the fenders, a common means connected with the rear end of the beams for adjusting the beams vertically, and means in connection with the said means for holding the beams in adjusted position, said adjusting means comprising a shaft journaled transversely of the frame and provided with pulleys at the beams, and a flexible member slidably connected with each beam at one end and winding over the pulley at the other end.

2. A cotton chopper, comprising a main wheel supported frame, a pair of shafts journaled in alinement at opposite sides of the frame and at the front thereof, a shaft journaled between and in rear of the first-named shafts, a plow beam pivoted at its front end on each of the said shafts, a series of supporting brackets on each plow beam and movable longitudinally thereof, means in connection with each bracket for holding the bracket in adjusted position, a pair of uprights or standards adjustable vertically with respect to the front bracket on each beam, a concavo-convex cutting disk journaled at the lower end of each standard or upright, the disks of each bracket being arranged with their convex surfaces adjacent and being spaced apart and being inclined away from each other toward the rear, a pair of fenders connected with each of the intermediate brackets of the beams and extending rearwardly in parallel relation, a pair of cultivating plows connected with the rear bracket of each beam and adjustable vertically with respect thereto and arranged to cultivate on each side of the fenders, a common means connected with the rear ends of the beams for adjusting the beams vertically, and means in connection with the said means for holding the beams in adjusted position.

3. A cotton chopper, comprising a main wheel supported frame, plow beams connected with the frame at their front end and adjustable laterally with respect to the frame, each beam being mounted to swing at its rear end vertically with respect to the frame, a common means for simultaneously raising and lowering the beams, and a series of three brackets slidable longitudinally of each beam, a pair of uprights or standards connected with the front bracket of each beam and adjustable vertically with respect to the bracket, a pair of fenders connected to the intermediate bracket of each beam and extending rearwardly in parallel relation, and a pair of cultivating plows connected with the rear bracket of each beam.

4. A cotton chopper, comprising a main wheel supported frame, beams pivoted to the frame at their front ends to swing vertically at their rear ends, the front ends of the beams being adjustable laterally with respect to the frame, a common means for simultaneously raising and lowering the rear ends of the beams, chopping mechanism, cultivating mechanism, and fender supporting mechanism mounted on each beam and adjustable longitudinally thereof, the chopping mechanism being at the front of the beam and cultivating mechanism at the rear of the beam, and the fenders extending approximately parallel on each side of the beams.

5. In a cotton chopper, a main frame, a beam mounted to swing on the frame, and mechanism supported by the beam for chopping out plants not needed, for leveling the ridges formed by the chopping mechanism, and having fenders for preventing the covering of the plants, the chopping mechanism comprising concavo-convex disks arranged in spaced relation and converging toward their front edges, each of the said mechanisms being supported by a bracket adjustable longitudinally of the beam.

6. In a cotton chopper, a supporting frame, a series of beams pivoted at their front ends to the frame for swinging movement, each of the beams supporting chopping and cultivating mechanism, the said chopping mechanism comprising disks arranged in inclined relation with respect to each other, the cultivating mechanism comprising plows arranged on each side of the space between the disks, and fenders supported by the beam on the inner sides of the plows.

7. A cotton chopper, comprising a main supporting frame, an axle journaled on the frame and provided at its ends with spindles, wheels journaled on the spindles, and sleeves mounted on the spindle adjacent to each wheel, said sleeves being interchangeable to the inner or the outer side of the wheels to permit the wheels to be adjusted toward and from each other, a bar arranged transversely of the front of the frame and extending beyond the wheels at its ends, a plow supported below the bar in front of each wheel, draft mechanism connected with the ends of the bar, and a common support for the plow and the draft mechanism adjustable longitudinally of the bar.

ROBERT HAMILTON.

Witnesses:
Morris B. Harrell,
W. B. Hamilton.

Copies of this patent may be obtained for five cents each, by addressing the "Commissioner of Patents, Washington, D. C."